United States Patent [19]
Kano

[11] Patent Number: 5,891,948
[45] Date of Patent: Apr. 6, 1999

[54] COATING MATERIAL FOR FORMING VARIEGATED PATTERNS OF GRANITE TONE AND RESIN FLAKES

[75] Inventor: Hiromichi Kano, Okayama-ken, Japan

[73] Assignee: Curios Co., Ltd., Okayama-ken, Japan

[21] Appl. No.: 630,099

[22] Filed: Apr. 9, 1996

[30] Foreign Application Priority Data

Jun. 19, 1995 [JP] Japan .................................. 7-175373

[51] Int. Cl.$^6$ .................. C08J 5/01; C08K 3/34
[52] U.S. Cl. .............. 524/492; 524/551; 524/556; 524/589; 524/426; 524/425; 524/493; 524/449; 524/450
[58] Field of Search .................. 524/551, 556, 524/589, 426, 425, 492, 493, 449, 450; 428/357, 402

[56] References Cited

U.S. PATENT DOCUMENTS

| | | | |
|---|---|---|---|
| 3,873,225 | 3/1975 | Jakobsen et al. | 404/41 |
| 4,063,942 | 12/1977 | Lundgren | 75/251 |
| 4,168,967 | 9/1979 | Sridhar et al. | 75/0.5 C |
| 4,197,351 | 4/1980 | Rolles et al. | 428/402 |
| 4,973,541 | 11/1990 | Kohri et al. | 430/111 |
| 5,230,953 | 7/1993 | Tsugeno et al. | 428/331 |
| 5,304,592 | 4/1994 | Ghahary | 524/437 |
| 5,328,795 | 7/1994 | Yamashiro et al. | 430/137 |
| 5,405,694 | 4/1995 | Foss | 428/359 |
| 5,407,988 | 4/1995 | Kogowski | 524/394 |
| 5,427,853 | 6/1995 | Powell et al. | 428/357 |
| 5,506,052 | 4/1996 | Deakyne et al. | 428/363 |

FOREIGN PATENT DOCUMENTS 524016  1/1993  European Pat. Off. ......... G03G 9/08

OTHER PUBLICATIONS

"Glossary of Technical Terms in Japanese Industrial Standards", p. 1109, with English abstract.
Japanese Industrial Standard, JIS–K5667, 1983, with English abstract.

Primary Examiner—Nam Nguyen
Assistant Examiner—Steven H. VerSteeg
Attorney, Agent, or Firm—McDermott, Will & Emery

[57] ABSTRACT

One-coating and one-package type coating material in which wall surfaces or the like of a building are finished into natural granite tone are disclosed. A group of flexible resin flakes having more than three kinds of colors and a binder which is turned to be substantially transparent when dried or set are mixed together. The resin flakes have an irregular shape and a random size, the thickness is uneven within one piece and every one piece, having a peripheral end which becomes continuously thin toward the outer edge, and have a color tone similar to the components of granite. Since the peripheral end of the resin flakes is continuously thin toward the outer edge, when coated, there is no unnatural difference in level in the superposed portions of resin flakes. Further, an external appearance and a quality sense extremely close to natural granite are obtained due to the unevenness of thickness of resin flakes. Further, since necessary deformation occurs in resin flakes during coating due to the flexibility, workability is good. The finish without irregularity and uneven color can be obtained by anybody.

31 Claims, 1 Drawing Sheet

COATING MATERIAL FOR FORMING VARIEGATED PATTERNS OF GRANITE TONE AND RESIN FLAKES

BACKGROUND OF THE INVENTION

1. Field of the Invention

This invention relates to a one-coat and one-package type coating material and resin flakes used for finishing concrete surfaces or mortar surfaces of walls and floors of a building, and board surfaces for various architectures into variegated patterns of granite tone.

2. Description of the Prior Art

Out of techniques of coating materials used to finish walls, floors and the like, there are about four kinds of techniques for finishing them similar to granite patterns as follows.

According to the first technique, crushed grains of granite or other crushed grains of natural stone themselves having a particle diameter of approximately 3 to 8 mm are mixed with resins which are turned to be almost transparent when dried or set to provide a one-package type (when executed) colorful pattern coating material of natural stone tone. This colorful pattern coating material is mainly finished with one coat using a trowel.

According to the second technique, natural or artificial multi-color aggregates having a wide distribution of particle diameter whose particle diameter is about 5 mm or less are mixed with resins which are turned to be almost transparent when dried or set to provide a one-package type colorful pattern coating material. This colorful pattern coating material is finished with one coat by way of spray coat or trowel coat.

According to the third technique, two colors or three colors which are separated in each package of the colorful pattern coating material as described in the second technique, which is prepared so that color when dried or set is similar to color of a natural granite component, are used. This technique is to form a colorful pattern of granite tone by three to four coats by using a multi-package type coating material for finishing the surfaces of walls into a colorful pattern by the special procedure comprising: first, spraying one color of natural stone base-tone on the whole surface, repeat-spraying (splash) another one color or two colors partly before the first-mentioned one color is dried, and repeat-spraying (return) one color of base-tone partly before these one color or two colors are dried.

According to the fourth technique, the coating materials of two colors or three colors of the coating materials as described in the third technique are simultaneously sprayed using a special sprayer of a double nozzle or a triple nozzle type to thereby form a colorful pattern of natural granite tone.

Among these techniques, the first technique has a long history. If the color of the crushed grains of the natural stone is similar to that of the component of granite, it is possible to obtain a colorful pattern similar to natural granite. The application is simple, and the finish is even and stable. However, since the crushed grains of the natural stone themselves are used as a color pattern material, all the shapes of the color pattern are roundish, independent, and nearly in the form of grains, (Hard aggregates are difficult to be coated unless they are in the form of grains which are all roundish in terms of properties of the trowel-coat operation.), thus failing to obtain irregularity in shape and random in size of a color pattern of the component of natural granite, and a pattern in which color patterns are intertwined.

Further, the trowel-coat material comprised of heavy aggregates and resins of this kind requires both excellent ductility by a trowel and viscosity to the extent that aggregates do not fall. Thus, the thickness of one coat is limited to about 8 mm, and accordingly, the size of aggregates is also limited to about 8 mm (In case of trowel-coat, aggregates having the size exceeding the coating thickness cannot be used.). Accordingly, it is not possible to expect the finish close to the pattern of natural granite having a color pattern of component larger in size than the above.

In the second technique, the size of aggregates is about 5 mm at its maximum in terms of properties of spray coat (When aggregates having the size larger than the above are used, they often drop when the coating material is sprayed, and the film surface is excessively rough.). Accordingly, only in the case of granite in which the color pattern of the component is very small, a colorful pattern of similar granite tone can be finished. However, the small color pattern of component will not be a pattern of granite often used.

In the third technique, if more than two persons extremely highly skilled in spraying art can be simultaneously secured and if application is done at the construction site in favorable conditions such as simpleness of scaffolding and wall surfaces to be applied, the size of the color pattern is considerably free and the finish bears some resemblance to the color pattern of natural granite. However, the colors of component are apt to be excessively mixed together in terms of properties of the repeat-coat, failing to obtain a sharp color pattern peculiar to the natural granite.

Further, in the actual execution site, talented men are limited, and narrowness and unstableness of the scaffolding, complicatedness of the shape of the wall surfaces to be applied are involved. In addition, colors of required coating materials are separated into separate containers, which should be prepared at once and on the same scaffolding nearly at execution time (There is a spray unit which coating material is passed through the hose by pressure, which however, requires a high cost.). Moreover, the application steps require 3 to 4 coats which are complicated. Accordingly, particularly, in the execution for a large area, it is very seldom to provide a uniformly finished pattern without uneven pattern.

The fourth technique is to improve the complicatedness and particularity of the spraying operation carried out in the third technique by devising the sprayer. However, the quality of the finish by the double nozzle type sprayer is inferior to that of the third technique. In the case where the triple nozzle type sprayer is used, the size and shape of the color pattern are generally free to obtain the finish considerably close to the pattern of the natural granite as compared with the first and third techniques but the colors of the component are apt to be excessively mixed together similar to the third technique, failing to obtain a sharp color pattern peculiar to the natural granite.

Moreover, since the colors of the required materials are separated into separate containers, the step of gathering colors in a single sprayer having three nozzles requires a great cost. In addition, the sprayer unavoidably becomes precise and bulky. Accordingly, in adjustment and handling of apparatus and in spraying technique, technicians highly skilled as compared with the third technique are required.

Further, with respect to the stableness and width of the scaffolding and the simpleness of the wall surfaces to be applied, more favorable conditions than the third technique are required. Accordingly, particularly, in large-area and high-story buildings, it is very seldom, as compared with the third technique, to provide an uniform-pattern finish without unevenness in finish.

As the coating finishing technique for forming a colorful pattern, the following techniques can be mentioned unless a finished appearance is limited to granite tone.

According to the fifth technique, a multi-phase coating of suspension type of gelatinous colored grains as defined in JIS K-5667 (multicolor paints) is used. Mainly for the finish of interior wall, a splash pattern of colored grains is formed easily and uniformly without unevenness by way of one spray coat or brush coat.

According to the sixth technique, fiber waste of various colors, cotton, torn paper, perlite, vermiculite, wooden pieces, extremely thin plastic pieces, etc., generally called fiber wall material, are mixed with a binder of cellulose powder which is soluble in water. The resultant mixture is mixed with water when in use. Then, a colorful pattern is formed by way of one trowel coat mainly for interior finish.

According to the seventh technique, a plastic sheet, which has a thickness of about 0.5 to 1.0 mm, is colored with a pigment, is apt to be broken and is even in thickness, is physically crushed to obtain crushed plastic pieces which are irregular in shape of the size less than about 30 mm and random in size. The resultant plastic pieces of a few colors are scattered on the colored adhesive having a concealing force precoated on the surface to be executed in so large amount as to cover more than the whole surface of the adhesive (Even if the crushed plastic pieces are scattered in the large amount, there necessarily occurs a part in which the crushed plastic pieces are not adhered to the adhesive, and therefore, it is necessary for the adhesive to provide with color and the concealing force.).

The excessive crushed pieces not adhered to the adhesive are allowed to naturally drop in case of the wall surfaces and are attracted and removed by a vacuum cleaner after the adhesive has been set in case of the floor surface. The levitated portion in which the crushed plastic pieces are superposed to each other, which necessarily occurs in terms of technique, is scraped off by a scraper. A difference in level between the crushed pieces after being scraped off is smoothed by sand paper, after which a transparent resin is coated. In this technique, at this time, some crushed pieces not sufficiently adhered are again levitated, and re-sanding is applied thereto. Accordingly, a transparent resin is again coated to provide a colorful finish.

However, the coating material used for the fifth technique is of the suspension type in liquid of gelatinous colored grains. Therefore, naturally there is a limitation in the size and shape of the colored grains. The size of the colored grains is about 7 mm at its maximum, and the shape unavoidably results in the roundish shape. This is the best work which rules the time as a mere colorful pattern coating material but cannot be variegated patterns of granite tone as intended by the present invention.

According to the sixth technique, variegated patterns of granite tone according to the present invention cannot be obtained in terms of properties of aggregates used.

Further, the seventh technique is common to the present invention in a single point that the thin pieces are used as a pattern forming material. However, since this technique is a mere technique for forming a colorful pattern, the thin pieces will merely suffice to be ones having various colors, shapes and sizes. Accordingly, a plastic sheet having a uniform thickness colored with a pigment, which can be easily molded by the general plastic molding technique should have breakable properties so that it can be manually crushed into thin peaces of suitable size. Therefore, the plastic peaces have breakable properties to be smaller. This is rather suitable for removing the portion which is the portion where the thin pieces are superposed to each other to which adhesive is not adhered, when the thin pieces are spread on the adhesive, by a scraper or sanding for smoothing a difference in level between the superposed portions.

That is, the thin pieces according to this technique are characterized in that they are breakable, and are of the scattering type to the utmost, which is incompatible with the technical idea of the present invention as being mixed with a binder.

The thickness of the thin pieces according to this technique is uniform, about 0.5 to 1.0 mm, which thickness should not be above or below the just-mentioned thickness for due reason. That is, when the thickness of the thin piece is excessively thin, the thin piece is apt to be broken, and since thin pieces are adhered to the adhesive without being superposed to each other, the thickness of the film is also excessively thin. Conversely, when the thickness is excessively thick, a difference in level between the superposed portions of the thin pieces becomes large, thus requiring a great cost in sanding.

The thickness of a finished film is nearly the thickness of the thin piece itself since only one of the thin pieces is adhered to the adhesive in terms of the technique of the scattering of thin pieces. Therefore, the thickness of a finished film exceeding 1 mm or more is impossible. Since the color of the adhesive need be concealed by the thin pieces, it is necessary to color the thin pieces with a pigment having a concealing force, failing to obtain a color tone of natural granite as intended by the present invention.

Further, this technique poses a disadvantage in that not only the step of execution is complicated but also the indispensable step of operation of the scattering of thin pieces is extremely unsuitable and wasteful for the outdoor execution and the execution relative to the wall surfaces.

SUMMARY OF THE INVENTION

The first object of this invention is to obtain a finish very close to a pattern of natural granite extremely as compared to the prior art.

The second object is to form a uniform colorful pattern without unevenness and uneven color in the finish irrespective of the shape and size of scaffolding and wall surfaces to be applied by anybody as long as normal technique of spray coat or trowel coat is present, in the site operation of buildings.

The third object is to provide an arrangement wherein in application, materials are simply handled, conventional apparatuses of spray coat or trowel coat will suffice as application apparatus, the steps of application are simple, and special cost is not required for execution time and execution apparatus.

The fourth object is to obtain a film thickness of about 1 to 7 mm by one coat.

The coating material of this invention comprises a mixture of a group of resin flakes having more than three different kinds of colors and a binder which is turned to be nearly transparent when dried or set. The resin flakes which are irregular in shape and random in size are characterized in that the resin flakes have a flexibility, have a peripheral end which continuously becomes thin toward the outer edge, are uneven in thickness within one piece or every piece, and have a color tone similar to the components of granite.

According to the knowledge of the present inventor, at least 3 colors or more, about 5 colors at the most, comprising 1 to 3 kinds of colors of colorful feldspar, one kind of color of colorful quartz, and one kind of color of a colored mica, are mixed as the component which can be discriminated by naked eyes while being fused in the shape which is irregular and random, so that the delicate color pattern which has depth and sharpness peculiar to natural granite is formed. The component of quartz and feldspar are translucent, and accordingly have a delicate color tone having a transparency and a see-through color in which for example, color of the colored mica is seen through under the color of feldspar.

The characteristic of this invention lies in solving the subject by simultaneously mixing, into a single binder, more than three kinds of different colors of resin flakes as solids which are called foreign substances in common sense when present in a coating material, as a pattern forming material corresponding to the components of natural granite.

According to the present invention, the finish extremely close to the pattern of natural granite extremely as compared to the prior art is obtained, and a uniform pattern without unevenness and uneven color in the finish irrespective of the conditions of scaffolding and wall surfaces to be executed is obtained by those having normal technique of spray coat or trowel coat.

In application, materials are simply handled, ordinary application apparatuses will suffice, the steps of execution are simple, and special cost is not required for execution time and execution apparatus.

It is possible to form a variegated pattern of granite tone having a film thickness of about 1 to 7 mm by one coat. Film has adequate strength.

DETAILED DESCRIPTION OF THE INVENTION

Figure 1:
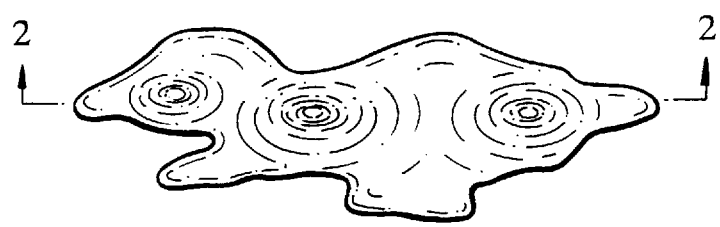
FIG. 1 is an enlarged plan view showing one example of resin flakes.

In the coating material according to the present invention, a pattern forming material comprises solid resin flakes. Therefore, the size of a pattern is free, and colors of the pattern are not excessively mixed. Accordingly, a sharp pattern like a color pattern of natural granite can be obtained.

The resin flakes have their peripheral edge formed to be continuously thin (naturally thin) toward the outer edge whereby when the coating material is coated, no unnatural difference in level occurs at a superposed portion of the resin flakes, and a natural fused feeling of the resin flakes similar to components of natural granite is obtained. Further, the resin flakes are formed to have an irregular shape and a random size to make it extremely similar to a pattern of natural granite.

The resin flakes are allowed to have a flexibility whereby a large pattern like feldspar components and quartz components of natural granite can be easily formed by spray coat or trowel coat using resin flakes having the longest diameter of 30 mm or less. Since some patterns of components of some natural granites are very large, the longest diameter of the resin flakes is set to 30 mm or less. However, the longest diameter often used in spray coat is 20 mm or less. In the case of trowel coat, the longest diameter of the resin flakes will suffice to be within 30 mm.

That is, first, in the case of spray coat, since the resin flakes are flexible, even if the diameter of the resin flakes is large, the ejection of the coating material from a material ejection nozzle of a spray gun becomes smooth because the resin flakes are deformed. Also in the case of trowel coat, the resin flakes are deformed due to the trowel pressure, and therefore, the smooth spreading of coating materials by the trowel can be obtained.

Further, the resin flakes are allowed to have a moderate tenacity whereby in mixing of resin flakes and a binder, they can be mixed without breaking the resin flakes.

The color tone of the resin flakes is made to be extremely similar to the components of granite. That is, out of resin flakes of more than three kinds of colors to be mixed in the coating material, the resin flakes of at least two kinds of colors are made to be colorful even in one piece. However, in the case of a color of a colored mica, not much colorfulness is required. Of course, even if all the resin flakes are made to be colorful, there involves no problem.

Further, the thickness of the resin flakes is made to be uneven within one piece and every one piece whereby when at least two kinds out of the resin flakes of more than three kinds of colors to be mixed in the coating material are exposed to natural light, they have a transparency in which a see-through is observed at least in a thin portion of the thickness so as to obtain a delicate color tone comprising a transparent sense and a see-through color like natural granite. Also, with respect to the resin flakes of color of a colored mica, when they are exposed to natural light, a see-through is observed in a thin portion of the thickness, which poses no problem. However, a see-through color would not be produced in terms of color (the color of a colored mica is often black, dark green, dark brown, etc.)

The composition for imparting the resin flakes used in the present invention a varied color and a transparent sense which are characteristics thereof will be described later in the embodiment. Basically, however, it can be easily obtained by mixing natural or artificial colored aggregates having a particle diameter of about 0.05 to 5 mm with resins which are turned to be transparent or nearly transparent when dried or set.

However, the compound of a large amount of pigments is not preferable except the case of the resin flakes which require no colorfulness or transparency such as black, dark green, dark brown, etc. of colors of a colored mica since the pigment has a high concealing force. Further, when the particle diameter of colored aggregates is smaller than 0.05 mm, the effect to be a varied color is hardly obtained, and when the particle diameter is excessively large exceeding 5 mm, the finished surface of the coating material becomes excessively rough, which is likewise not preferable. Most suitable particle diameter often used is 0.05 to 2 mm. In anyway, if the color tone, particle diameter and transparency of aggregates used are suitably selected, it is possible to obtain resin flakes having the desired color and transparent sense extremely similar to the components of granite.

This invention is further characterized in that a one-coat and one-package type coating material is provided in such a manner that resin flakes are mixed with a binder so that a uniform pattern without unevenness in finish and uneven color may be obtained through the application by anyone of those having a normal technique of spray coat or trowel coat.

Since the coating material is of the one-package type, the material is simply handled, and the application may be done merely by one coat using the conventional spray coat or trowel coat apparatuses. Accordingly, the execution steps are simple, and special cost for execution time and execution apparatus is not required.

The thickness within one piece of the resin flakes is made uneven whereby its average thickness can be increased. Therefore, the film thickness of the order of 1 to 7 mm can be easily obtained by one coat. However, the maximum thickness of the most suitable resin flake is of the order of 1 to 2 mm, and the average thickness of the film for one coat often used is of the order of 1.5 to 3 mm.

The composition materials for such resin flakes are resins, natural aggregates and artificial aggregates, to which are added an body pigment, an additive, and a small amount of pigments, as necessary.

In the embodiment, as resins in which resin flakes are allowed to have a flexibility, an acryl resin latex was used. However, those which are flexible and excellent in weather resistance, water resistance, alkali resistance, resistance to cold and the like such as a chloroprene group, an ethylene acryl copolymer group, an acryl butadiene group, soft urethane resins, silicon resins, etc. may be also used.

In natural aggregates, lime rock, calcite, white silica sand, silica of high purity, white mica, etc. which are crushed and classified by the particle diameter are used as white natural aggregates. The white natural aggregates are natural resources which are all stable in color and rich in amount and inexpensive. Particularly, the lime rock is inexpensive and in addition the particle diameter thereof is free and therefore the lime rock is optimal as a white group.

As colored natural aggregates, marble, serpentine, granite, colored silica, colored mica, minogasumi, etc. which are crushed and classified by the particle diameter are used. However, the colored natural aggregates are poor in stability of color and expensive except several kinds such as colored silica, colored mica, serpentine, minogasumi, etc. Therefore, artificial colored aggregates are often used.

Since gray or brownish gray of quartz component of granite is high in transparency, the natural colored silica aggregate is suitable for forming resin flakes of quartz component for the present invention. However, also in the case of quartz component, if an artificial coloring is employed, color is excellent in stability and colors can be freely obtained, which are therefore suitable for the present invention.

Artificial aggregates can be easily obtained, for example, by coating white natural aggregates with a coating. Particularly, if transparency is required as in quartz component, aggregates such as silica, calcite, etc. which are high in transparency are used as base materials, which may be coated with a coating having high transparency. The transparency to the extent of feldspar component is sufficiently obtained by using lime stone aggregates as a base material. In the case of colored aggregates not requiring the transparency, crushed and classified porcelain or earthenware can be used. This case would be limited to white and black in terms of stability of color and price.

The body pigment used may include any one which is normally used as a coating raw material. Calcium carbonate is optimal in terms of price and whiteness degree.

As additives, a defoaming agent, a plasticizer, a viscosity rising agent, an antifreezing agent (in case of a water group), anticeptics, a mildewproofing agent, etc. can be suitably selectively used.

One example of a method for forming resin flakes will be described hereinafter.

First, the viscosities of composition materials for forming resin flakes prepared in respective colors are prepared. That is, when the resin flakes need be thicker and thinner on the average, a high viscosity and a low viscosity, respectively, are selected. As kinds of thicknesses of the resin flakes, in practice, two kinds for a thin film and a thick film will suffice except the special case. The coating amounts of the composition materials for the thin film and the thick film, respectively, are set in advance. Further, the size of nozzle and the type of a spray gun are optimally set depending on the size and thickness of the resin flakes, and the spraying air pressure, and the moving speed, moving intervals, moving times and moving modes (lateral coating and longitudinal coating) of the spray gun are set. As kinds of the sizes of the resin flakes, three kinds for a standard pattern, a large pattern and a small pattern will suffice.

A waxed board which has smooth or citron-skin surface is installed. The composition material for the resin flake is sprayed on the aforesaid board surface in an independent granular manner by the spray gun, dried and set, after which the resin flakes are peeled off from the aforesaid board surface.

Figure 2:
FIG. 2 is an end view taken on line 2—2 of FIG. 1 of a resin flake formed by spraying a composition material of the resin flake on a waxed board whose surface is smooth.
Figure 3:
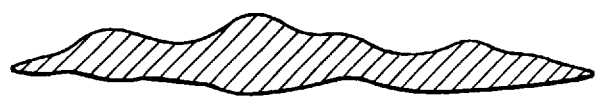
FIG. 3 is an end view taken on line 2—2 of FIG. 1 of a resin flake formed by spraying a composition material of the resin flake on a waxed board whose surface is like the skin of citron.

Out of the resin flakes peeled off, those having the diameter larger than the predetermined longest diameter are classified and removed. In the resin flakes thus formed, naturally, the peripheral end is continuously thin, the thickness is uneven within one piece and every one piece, the shape is irregular and the size is random as shown in FIG. 1 to 3.

The thus formed resin flakes are assorted according to the kinds of colors and thicknesses, and the longest diameter. That is, they are assorted according to each color, but not assorted according to each thickness and each long diameter in a certain range. Out of resin flakes formed from a single waxed board only those having a diameter larger than the predetermined longest diameter are classified and removed. The remainder are assorted as resin flakes of one kind of a pattern forming component regardless of size of diameters and thickness.

Finally, the preparation of coating materials will be explained.

More than three colors are selected out of the assorted resin flakes according to desired film thickness, and the color, and size of the component of natural granite to which the coating material is made similar, and they are gently mixed with a binder having spray coat aptitude, or the trowel coat aptitude and the performance necessary for a film. As the standards of the gentle stirring, 30 to 100 r.p.m. is employed, and as the stirring blade, a plate blade, a rod blade or the like are used instead of a screw type or a propeller type.

As the kind of the binder, an acryl resin emulsion is used in the embodiment. However, as the emulsion type binder, other materials may be used such as an acryl styrene copolymer group, a vinyl versatate group, a vinyl acetate copolymer, various synthetic rubber latex, a urethane resin group, an epoxy resin group, etc. Further, solventless urethane resins, epoxy resins, silicone resins and the like can be used. An inorganic high molecular group such as colloidal silica and soda silicate can be also used.

However, in the present invention, the resin flakes as solids which are called foreign substances in common sense are mixed into the binder so that they may be coated by normal spraying and trowel coat. Therefore, it is necessary to fully study the consideration and preparation of the workability of the binder.

If the resin flakes and the binder are formed of resins having a rubber-like elasticity, a film formed from the coating material of the present invention will be an elastic film having a rubber-like elasticity and capable of cracks of surfaces of walls. Further, when a binder is rich in abrasion resistance, a dressing material for floor may be obtained.

As additives mixed into the binder of the present invention as necessary, all the additives to be added to the normal coating material can be used. Particularly, they are a material for improving workability of a coating material, that is, a material for improving viscosity of a binder.

Further, the fine grains of aggregates which are mixed into a binder as necessary are, for example, such as aggregates obtained by crushing and classifying white mica and lime stone. The white mica imparts a coating material properties of polarizing reflection of an extremely thin mica of natural granite. Another fine grains of aggregate adjust a touch of a finished film surface and make the ejection of coating material from a spray gun and the spreading of coating material by a trowel smooth.

When a film is required to have much more luster, transparent resins which are good in weather resistance and free from discoloration may be coated as a top coat after the coating material is dried by spray coat, roller coat, or brush coat. For the purpose of improving the durability, stain-resistance, chemical-resistance, air-tightness, water-proofing, etc., instead of the point of luster, top coats suitable for the respective purposes may be coated.

As can be seen from the characteristics of the present invention, the peripheral end of the resin flake is formed to be continuously thin toward the outer edge. Therefore, an unnatural difference in level does not occur in portions where the resin flakes are superposed to each other, merely by the coating by way of spray coat or trowel coat, to obtain a natural fused sense of the resin flakes similar to the components of natural granite.

Further, since the thickness of the resin flakes is formed to be uneven within one piece or every one piece, the thickness sense, depth, colorfulness, see-through color, transparency, etc. peculiar to the components of natural granite can be given.

If the resin flakes are thin pieces whose thickness is uniform to a degree that is not unnatural at the superposed portions of the resin flakes, the desired thickness sense, depth, and colorfulness would not be obtained. Conversely, if the resin flakes are uniformly thick, the unnatural difference in level is removed and, a great deal of labor and cost would be required. Or else, if the thickness is uniformly determined to be 2 mm, it would greatly interfere with the workability of spray coat and trowel coat despite the possession of flexibility, failing to obtain the desired delicate see-through color or transparency.

By allowing the resin flakes to have flexibility, deformation necessary for work occurs in the resin flakes when work such as spray coat or the like takes place.

For example, the coating material including resin flakes having the longest diameter of 16 mm can be smoothly and easily ejected without clogging a nozzle by a spraying spray gun having a nozzle aperture of 12 mm and coated uniformly on the surface to be coated with substantially uniform thickness. If the resin flakes are hard, the longest diameter capable of being ejected with an aperture of 12 mm is 8 mm or so, if so much.

This means that if the nozzle aperture of the ordinary spray gun is 15 mm, the application can be made even by spray coat up to about 20 mm of the longest diameter of the resin flakes. That is, that size of the resin flake means that most of patterns of natural granite often used can be applied even by the spray coat. However, in case of the resin flake whose longest diameter exceeds 20 mm, the trowel coat would be more advantageous than the spray coat in terms of workability.

Also in the case of trowel coat, deformation of the resin flake caused by the trowel pressure occurs because the resin flake has flexibility to improve workability of trowel coat.

Further, since the resin flakes have flexibility, when coating material is applied even if some bound or some warp of the resin flakes should occur in the coated material, the bound or the warp can be suppressed by simple measures such as a suppressing by trowel or pipe roller such as a vinylchloride pipe at the adequate timing (at the time that the drying or setting of the binder advances and a caking force is increased to be more than that at the outset of coating) in the midst of drying and setting the coating material. When this suppressing work is carefully performed, even if there are present gaps in the superposed portions of the resin flakes, most of the gaps can be eliminated.

DESCRIPTION OF THE PREFERRED EMBODIMENT

First, resin flakes of desired colors used in the present invention are formed by the aforementioned method. With respect to resin flakes of the respective colors, examples of the rate (weight ratio) of composition materials therefor are given below. In the embodiment, the resin flakes were assorted into two kinds, for thin coating (maximum thickness is about 1.2 mm) and for thick coating (maximum thickness is about 2 mm) according to the thickness of the resin flakes every color tone, and three kinds, for standard pattern (longest diameter is about 15 mm), for large pattern (longest diameter is about 20 mm), and for small pattern (longest diameter is about 10 mm) according to the longest diameter of the resin flakes.

|  | % |
|---|---|
| 1. In case of color tone of white feldspar | |
| Acryl resin latex (solid content: 55%) | 32 |
| Natural aggregate (white, grain size: 0.05–0.5 mm) | 40 |
| Artificial aggregate (white, grain size: 0.05–0.5 mm) | 10 |
| Body pigment (white, grain size: less than 0.05 mm) | 10 |
| Additive | 3 |
| Water | 5 |
| Total | 100 |
| 2. In case of color tone of pink feldspar | |
| Acryl resin latex (solid content: 55%) | 32 |
| Natural aggregate (white, grain size: 0.05–0.5 mm) | 40 |
| Artificial aggregate (white, grain size: 0.05–0.5 mm) | 5 |
| Artificial aggregate (reddish brown, grain size: 0.05–1 mm) | 10 |
| Body pigment (white, grain size: less than 0.05 mm) | 5 |
| Additive | 3 |
| Water | 5 |
| Total | 100 |
| 3. In case of color tone of reddish brown feldspar | |
| Acryl resin latex (solid content: 55%) | 32 |
| Natural aggregate (white, grain size: 0.05–0.5 mm) | 20 |
| Artificial aggregate (brown/gray, grain size: 0.1–2 mm) | 5 |
| Artificial aggregate (reddish brown, grain size: 0.05–1 mm) | 35 |
| Additive | 3 |
| Water | 5 |
| Total | 100 |
| 4. In case of color tone of gray quartz | |
| Acryl resin latex (solid content: 55%) | 32 |

-continued

| | % |
|---|---|
| Natural aggregate (white, grain size: 0.05–0.5 mm) | 40 |
| Natural aggregate (gray, grain size: 0.1–2 mm) | 10 |
| Artificial aggregate (gray, grain size: 0.1–2 mm) | 10 |
| Additive | 3 |
| Water | 5 |
| Total | 100 |
| 5. In case of color tone of brown.gray quartz | |
| Acryl resin latex (solid content: 55%) | 32 |
| Natural aggregate (white, grain size: 0.05–0.5 mm) | 35 |
| Natural aggregate (brown.gray, grain size: 0.1–2 mm) | 10 |
| Artificial aggregate (brown.gray, grain size: 0.1–2 mm) | 15 |
| Additive | 3 |
| Water | 5 |
| Total | 100 |
| 6. In case of color tone of colored mica | |
| Acryl resin latex (solid content: 55%) | 32 |
| Natural aggregate (white, grain size: 0.05–0.5 mm) | 30 |
| Artificial aggregate (brown.gray, grain size: 0.1–2 mm) | 5 |
| Artificial aggregate (black, grain size: 0.05–1 mm) | 25 |
| Additive | 3 |
| Water | 5 |
| Total | 100 |

Next, more than three colors are suitably selicted out of the assorted resin flakes to prepare coating materials for forming patterns of granite to make similar thereto. In the following embodiments, coating materials for white granite tone, and red granite tone were prepared by compounding the following materials. In any of these cases, the rate is weight ratio.

| Resin flakes | % |
|---|---|
| 1. Coating material for white granite (standard pattern, desired film thickness: about 2 mm) | |
| White feldspar | 25 |
| For thin coating, maximum thickness: 1.2 mm; for standard pattern, longest diameter: about 15 mm | |
| Grey quartz | 8 |
| For thin coating, maximum thickness: 1.2 mm; for standard pattern, longest diameter: about 15 mm | |
| Black colored mica | 7 |
| For thin coating, maximum thickness: 1.2 mm; for small pattern, longest diameter: about 10 mm | |
| Binder (acryl resin emulsion, solid content: 50%) | 45 |
| White translucent aggregate | 15 |
| (crushed lime stone, grain size: 0.05–0.25 mm) | |
| Total | 100 |
| 2. Coating material for cherry granite (large pattern, desired film thickness: about 3.5 mm) | |
| Pink feldspar | 8 |
| For thick coating, maximum thickness: about 2 mm; for large pattern, longest diameter: about 20 mm | |
| White feldspar | 26 |
| For thin coating, maximum thickness: 1.2 mm; for standard pattern, longest diameter: about 15 mm | |
| Brown.gray quartz | 10 |
| For thick coating, maximum thickness: about 2 mm; for large pattern, longest diameter: about 20 mm | |
| Black colored mica | 4 |
| For thin coating, maximum thickness: 1.2 mm; for small pattern, longest diameter: about 10 mm | |
| Binder (acryl resin emulsion, solid content: 50%) | 52 |
| Total | 100 |

-continued

| Resin flakes | % |
|---|---|
| 3. Coating material for red granite (standard pattern, desired film thickness: about 2 mm) | |
| Reddish brown feldspar | 25 |
| For thin coating, maximum thickness: 1.2 mm; for standard pattern, longest diameter: about 15 mm | |
| Brown.gray quartz | 6 |
| For thin coating, maximum thickness: 1.2 mm; for small pattern, longest diameter: about 10 mm | |
| Black colored mica | 9 |
| For thin coating, maximum thickness: 1.2 mm; for standard pattern, longest diameter: about 15 mm | |
| Binder (acryl resin emulsion, solid content: 50%) | 50 |
| White translucent aggregate | 10 |
| (crushed lime stone, grain size: 0.05–0.25 mm) | |
| Total | 100 |

Finally, execution examples will be explained.

EXECUTION EXAMPLE 1

The coating material of the rate of 3.5 kg/sq.m for white granite was coated on the wall surface of concrete whose ground is prepared in advance by using a spray gun (commonly called a stucco gun) having a material ejecting nozzle aperture of 12 mm (air nozzle aperture: 2 mm) under pressure of air nozzle of 1.5 kgf/sq.cm. Slight bound and warp of the resin flakes occurred, and the surface was lightly pressed by a plastic roller in the state where the coating material is not dried. A film having smooth rugged surface without uneven pattern with a thickness of about 1.5 to 2.5 mm which has a color pattern of standard size extremely close to natural white granite was obtained on the wall surface having the coating material dried thereon.

EXECUTION EXAMPLE 2

The coating material for cherry granite was coated on the mortar wall surface, whose ground is prepared in advance, by trowel coat at the rate of 6 kg/sq.m. A film having nearly smooth surface without uneven pattern having a large color pattern with a thickness of about 3.5 mm is extremely close to natural cherry granite was obtained on the wall surface having the coating material dried thereon. Further, after the film has been fully dried and set, a solution resin of a silicon acryl copolymer group which is turned to be transparent after dried was coated as a top coat to obtain a film whose surface is considerably lustrous.

EXECUTION EXAMPLE 3

The coating material for red granite was likewise sprayed on the wall surface similar to that of the aforementioned Execution Example 1 to obtain a film having a smooth rugged surface without uneven pattern which has a standard size color pattern extremely close to natural red granite. A top coat was applied similar to the aforementioned Execution Example 2.

What is claimed is:

1. A coating material for forming variegated patterns of granite tone comprising:
   a group of resin flakes having more than three kinds of resin flakes which have different colors from each other, said resin flakes have flexibility, irregular shapes, random sizes, uneven thickness within one piece and every one piece, a peripheral end which becomes randomly and continuously thin toward an outer edge, and a color tone which is similar to the components of granite and a binder which becomes transparent or translucent when dried or set, said group of resin flakes are mixed with said binder.

2. The coating material for forming variegated patterns of granite tone according to claim 1, wherein said resin flakes are formed by colored aggregates having a grain size of the order of 0.05 to 5 mm and resin which becomes transparent or translucent when dried or set.

3. The coating material for forming variegated patterns of granite tone according to claim 2, wherein the composition materials for said resin flakes include a body pigment or/and an additive.

4. The coating material for forming variegated patterns of granite tone according to claim 3, wherein the composition materials for said resin flakes include a pigment.

5. The coating material for forming variegated patterns of granite tone according to claim 4, wherein said resin flakes have the diameter of 30 mm or less and the thickness of 5 mm or less.

6. The coating material for forming variegated patterns of granite tone according to claim 3, wherein said resin flakes have the diameter of 30 mm or less and the thickness of 5 mm or less.

7. The coating material for forming variegated patterns of granite tone according to claim 2, wherein said resin flakes have the diameter of 30 mm or less and the thickness of 5 mm or less.

8. The coating material for forming variegated patterns of granite tone according to claim 1, wherein the composition materials for said resin flakes include a body pigment or/and an additive.

9. The coating material for forming variegated patterns of granite tone according to claim 8, wherein the composition materials for said resin flakes include a pigment.

10. The coating material for forming variegated patterns of granite tone according to claim 9, wherein said resin flakes have the diameter of 30 mm or less and the thickness of 5 mm or less.

11. The coating material for forming variegated patterns of granite tone according to claim 8, wherein said resin flakes have the diameter of 30 mm or less and the thickness of 5 mm or less.

12. The coating material for forming variegated patterns of granite tone according to claim 1, wherein said resin flakes have the diameter of 30 mm or less and the thickness of 5 mm or less.

13. The coating material for forming variegated patterns of granite tone according to claim 1, wherein said resin flakes have tenacity so that they can be mixed with a binder without breaking.

14. The coating material for forming variegated patterns of granite tone according to claim 1, wherein said resin flakes have the thickness of the order of 1 to 2 mm.

15. The coating material for forming variegated patterns of granite tone according to claim 1, wherein said group of resin flakes have at least two different kinds of flakes which are made to be colorful even within one piece.

16. The coating material for forming variegated patterns of granite tone according to claim 15, wherein said resin flakes are formed by mixing colorful aggregates having grain size of 0.05 to 5 mm and resin which becomes transparent or translucent when dried and set.

17. The coating material for forming variegated patterns of granite tone according to claim 1, wherein the component materials for said binder include fine grains of aggregates and/or an additive.

18. Resin flakes for forming variegated patterns of granite tone, said resin flakes comprising colored aggregates having a grain size of the order of 0.05 to 5 mm and a resin which becomes transparent or translucent when dried or set, wherein said resin flakes have flexibility, irregular shapes, random sizes, uneven thickness within one piece and every one piece, a peripheral end which becomes randomly and continuously thin toward an outer edge and a color tone similar to the components of granite.

19. The resin flakes for forming variegated patterns of granite tone according to claim 18, wherein the composition materials for said resin flakes include a body pigment or/and an additive.

20. The resin flakes for forming variegated patterns of granite tone according to claim 19, wherein the composition materials for said resin flakes include a pigment.

21. The resin flakes for forming variegated patterns of granite tone according to claim 20, wherein said resin flakes have the diameter of 30 mm or less and the thickness of 5 mm or less.

22. The resin flakes for forming variegated patterns of granite tone according to claim 19, wherein said resin flakes have the diameter of 30 mm or less and the thickness of 5 mm or less.

23. The resin flakes for forming variegated patterns of granite tone according to claim 18, wherein the composition materials for said resin flakes include a body pigment or/and an additive.

24. The resin flakes for forming variegated patterns of granite tone according to claim 23, wherein the composition materials for said resin flakes include a pigment.

25. The resin flakes for forming variegated patterns of granite tone according to claim 24, wherein said resin flakes have the diameter of 30 mm or less and the thickness of 5 mm or less.

26. The resin flakes for forming variegated patterns of granite tone according to claim 23, wherein said resin flakes have the diameter of 30 mm or less and the thickness of 5 mm or less.

27. The resin flakes for forming variegated patterns of granite tone according to claim 18, wherein said resin flakes have the diameter of 30 mm or less and the thickness of 5 mm or less.

28. The resin flakes for forming variegated patterns of granite tone according to claim 18, wherein said resin flakes have the diameter of 30 mm or less and the thickness of 5 mm or less.

29. The resin flakes for forming variegated patterns of granite tone according to claim 18, wherein said resin flakes have tenacity so that they can be mixed with a binder without breaking.

30. The resin flakes for forming variegated patterns of granite tone according to claim 18, wherein said resin flakes have the thickness of about 1 to 2 mm.

31. The resin flakes for forming variegated patterns of granite tone according to any one of claims 18 or 19–30, comprising aggregates of more than two different kinds of colors.

* * * * *